US006883855B2

(12) United States Patent
Chverchko et al.

(10) Patent No.: US 6,883,855 B2
(45) Date of Patent: Apr. 26, 2005

(54) HINGED TONNEAU COVER FOR TRANSPORTING A SIGNIFICANT TOP LOAD

(75) Inventors: Matthew Chverchko, Philipsburg, PA (US); Ethan D. Wendle, Harrisburg, PA (US)

(73) Assignee: Diamondback Automotive Accessories, Inc., State College, PA (US)

( * ) Notice: Subject to any disclaimer, the term of this patent is extended or adjusted under 35 U.S.C. 154(b) by 0 days.

(21) Appl. No.: 10/644,402

(22) Filed: Aug. 20, 2003

(65) Prior Publication Data

US 2004/0195857 A1 Oct. 7, 2004

Related U.S. Application Data

(60) Provisional application No. 60/459,255, filed on Apr. 1, 2003.

(51) Int. Cl.[7] .................................................. B60P 7/02
(52) U.S. Cl. ............................ 296/100.09; 296/100.06; 296/100.07
(58) Field of Search ..................... 296/100.09, 100.07, 296/100.06, 100.18, 37.6, 100.1, 100.02, 100.01, 100.17, 100.08, 165, 39.2

(56) References Cited

U.S. PATENT DOCUMENTS

| 3,420,570 | A |   | 1/1969  | Kunz           |           |
|-----------|---|---|---------|----------------|-----------|
| 3,489,456 | A | * | 1/1970  | Klanke         | 296/100.07|
| 3,514,152 | A |   | 5/1970  | Hermon         |           |
| 3,936,077 | A |   | 2/1976  | Bliek          |           |
| 4,313,636 | A | * | 2/1982  | Deeds          | 296/100.09|
| 4,418,954 | A | * | 12/1983 | Buckley        | 296/100.09|
| 4,573,730 | A |   | 3/1986  | Gondert et al. |           |
| 4,824,162 | A | * | 4/1989  | Geisler et al. | 296/100.09|
| 5,183,309 | A | * | 2/1993  | Jordan         | 296/100.07|
| 5,207,262 | A |   | 5/1993  | Rushford       |           |
| 5,301,995 | A |   | 4/1994  | Isler          |           |
| 5,564,773 | A | * | 10/1996 | Lapsley et al. | 296/100.06|
| 5,636,893 | A |   | 6/1997  | Wheatley et al.|           |
| 5,657,916 | A | * | 8/1997  | Tackett        | 296/37.6  |
| 5,857,729 | A | * | 1/1999  | Bogard         | 296/100.09|
| 5,961,173 | A | * | 10/1999 | Repetti        | 296/100.09|
| 6,082,806 | A | * | 7/2000  | Bogard         | 296/100.09|
| 6,095,588 | A | * | 8/2000  | Rodosta        | 296/100.09|
| 6,109,681 | A |   | 8/2000  | Edwards et al. |           |
| 6,152,513 | A | * | 11/2000 | Karrer         | 296/37.6  |
| 6,170,900 | B1| * | 1/2001  | Kooiker        | 296/107.09|
| 6,203,086 | B1| * | 3/2001  | Dirks et al.   | 296/100.07|
| 6,227,602 | B1| * | 5/2001  | Bogard         | 296/100.09|
| 6,234,559 | B1| * | 5/2001  | Block et al.   | 296/100.06|
| 6,338,520 | B1| * | 1/2002  | Rusu et al.    | 296/100.09|
| 6,340,194 | B1|   | 1/2002  | Muirhead et al.|           |
| 6,533,344 | B1| * | 3/2003  | Patterson      | 296/100.06|
| 6,616,210 | B1| * | 9/2003  | Massey         | 296/100.06|

* cited by examiner

*Primary Examiner*—Kiran B. Patel
(74) *Attorney, Agent, or Firm*—McNees Wallace & Nurick LLC (57) ABSTRACT

A cover for the rear storage compartment of a pickup truck or similar vehicle having an open top storage compartment, the cover comprised of at least two panels made of a rigid material casing attached to structural members specifically designed to support and transport a significant load placed on top of the cover. At least one panel is substantially and removably secured to the top of the sidewalls of the rear storage compartment by attachment means that does not require drilling into any portion of the vehicle. In addition, all the non-substantially secured panels are lockable, and are hingedly and removably attached to the at least one substantially secured panel, providing secure and easy access to the rear storage compartment. The hinge attachment further allows for each non-substantially secured panel to be removed individually, providing alternative panel configurations for carrying large items. Finally, all panels work in conjunction with locking rods and water sealant devices to provide a substantially water resistant and secure cover.

20 Claims, 7 Drawing Sheets

HINGED TONNEAU COVER FOR TRANSPORTING A SIGNIFICANT TOP LOAD

CROSS-REFERENCE TO RELATED APPLICATIONS

This application claims the benefit of U.S. Provisional Patent Application No. 60/459,255, filed Apr. 1, 2003.

BACKGROUND OF THE INVENTION

This invention relates to apparatus and methods for covering the rear storage compartment of pickup trucks and similar vehicles. Specifically, the invention relates to a cover apparatus designed to bear and transport a significant top load while maintaining the storage volume of the compartment. In addition, the present invention relates to a covering apparatus with a hinged multiple-panel system for easily accessing all portions of the storage compartment without removing the cover.

Pickup trucks are the most common vehicle designed to include a rear storage compartment. However, other vehicles, including highway vehicles and off-road vehicles such as All-Terrain Vehicles and open trailers, also contain rear storage compartments. Such compartments are composed of two sidewalls or bedrails, an end wall (near the cab or front of the vehicle) and a tailgate which can be lowered or removed to gain access to the contents of the storage compartment or raised to form a rectangular, open topped compartment. Though this compartment, or bed, as it is commonly referred to, is used for the storage of goods, its open top presents many problems for proper storage of valuable, smaller sized items. One of these problems is exposure to the elements. Supplies located in the bed of pickup trucks are completely susceptible to rain, snow, hail, and other environmental conditions. Another problem with the exposed bed is the lack of security provided. With no lid enclosure, goods can easily be removed from the bed, both through unintended load shifting and through theft. Still another negative result of the open topped storage compartment is fuel inefficiency. Air flow restricted by the tailgate portion of the bed causes severe drag resistance on the vehicle's forward motion.

In order to solve these problems and, in some cases, improve the aesthetics of their vehicles, many pickup truck owners put what is generally referred to as a tonneau cover on their truck beds. The basic principle of a tonneau cover is to enclose the open topped storage compartment. This has been accomplished in a number of ways. For example, U.S. Pat. No. 5,207,262 to Rushford (1993) describes a tonneau cover made of a soft fabric material. This material is secured to a track placed on the top portion of the bedrails of the bed by a number of snaps. While the Rushford cover does address the needs of fuel efficiency, element resistance, and removal of goods by unintended load shifting, it does not strongly discourage the removal of stored goods through theft. The fabric nature and snap system of the Rushford-type tonneau covers leaves the cargo stored in the bed at great risk of theft. In addition to this shortfall, fabric covers are susceptible to thermal expansion and retraction that produces a strain on the fabric. Over time, element damage and resulting strain tears the fabric, rendering the fabric cover useless. Furthermore, when the cover is on the truck bed, the hauling capabilities of the truck are limited to the volume underneath the cover, since the fabric cover is not designed to support or transport a top load.

Hard tonneau covers have been designed to address the security issue, but do not adequately address the continuing need for convenient and flexible installation and use. Most hard tonneau covers are fabricated using polyester resins, foam, fiberglass, moldable plastic, metals or a combination of these materials. One such cover can be seen in U.S. Pat. No. 6,340,194 to Muirhead, et al. The Muirhead cover is lockable and hinged to the end of the truck bed closest to the cabin compartment of the truck. Many hard tonneau covers are made in a similar fashion to the one found in the Muirhead patent. These known hard tonneau covers work relatively well in preserving the contents of the truck bed from weather related damage, as well as from theft. Known hard covers, however, have many drawbacks. One drawback is that they almost invariably are designed to rest in or on a track system. This track system often contains many parts and requires time consuming and difficult assembly. The track system usually demands precision installation. This usually means that the truck owner must have his cover professionally installed.

Another major disadvantage to some hard tonneau covers is clearly displayed in U.S. Pat. No. 6,533,344 to Patterson, as well as U.S. Pat. No. 4,313,636 to Deeds. While the Patterson cover is designed to be lockable, and is capable of being hinged and easily removed, the cover displays many characteristic problems. The first of these problems is that the design of the Patterson tonneau cover makes water resistance difficult if not impossible. Another common problem associated with the Patterson and Deeds cover is the requirement of external support members which must be installed to support the cover over the storage compartment. Both covers require an external track or bracing device. The support members are mounted on top of the side walls of the truck bed in the Deeds patent, and on the inside edge of the side walls in the Patterson patent. The Patterson patent describes the use of angle iron as the bracing for the tonneau cover. The bent outside edges of the tonneau cover panel rest on these pieces of angle iron providing some potential lightweight top loading capability. The angle iron and brace system, in addition to reducing the interior volume of the truck bed (up to 25% in the Patterson patent), is connected to the inside edge of the sidewall of the truck bed by bolts that traverse through holes drilled in the truck bed itself. This exemplifies a major problem with many hard top tonneau covers. Drilling holes in the metal portion of the truck bed greatly encourages corrosion of the metal. In addition to this, drilling is often difficult, requiring precision and advanced machinery. Another problem associated with drilling into the truck bed is that most lease agreements prohibit such alterations to the truck.

U.S. Pat. No. 6,109,681 to Edwards, et al. addresses this drilling problem. The solution, as described by Edwards, is a track for hard tonneau covers that is not drilled, but rather clamped onto the truck bed. However, Edwards patent discloses this solution for fiberglass covers that are incapable of carrying an external load. In addition, the Edwards patent utilizes a track mechanism that requires that more parts than just the tonneau cover be purchased, adding to the total cost of the system and the assembly time of the cover.

Another deficiency in the design of known hard tonneau covers is the inability to haul a significant top load. While some manufactures of hard tonneau covers claim that a top load can be supported, they simply mean that the cover can support some incidental weight while the truck is stationary. Due to the material and design of known covers, as well as the lack of any tie down apparatus on most of these covers, no significant top load can be transported on top of the cover. In fact, the only known cover is designed to actually transport any top load. That cover is the Mountain Top Tonneau Cover manufactured by Mountain Top Industries, Inc. The Mountain Top cover is made of aluminum, and is rated to carry up to 220 lbs on top of the cover. This is not a significant load. The cover includes external rails that allow cargo to be strapped down during transportation. The Mountaintop cover, however, also exemplifies numerous deficiencies, for example, the Mountain Top Tonneau Cover requires that holes are drilled into the truck so that bolts can be inserted to support the gas springs of the cover. The result of this requirement is that the cover cannot be used on leased trucks, and also that corrosion of the truck bed is promoted by the drilling of mounting holes. Another problem with the Mountain Top cover, and other known hard tonneau covers, is that the cover consists of one large panel. The cumbersome size and heavy weight of one large panel makes installation, opening, removal, and storage of the cover extremely difficult. The cover panels may weight 200 pounds or more, making them very difficult to handle. Additionally, any time the truck owner wants to haul an object that is higher than the bedrails of the truck, the owner must remove the cover, requiring him to obtain help to remove the large heavy panel and to find a place to store it.

Another problem presented by known single-panel hard tonneau covers is the difficulty in obtaining access to cargo in the portion of the bed nearest the cab since the panel hinge is located on the end of the bed nearest the cab. When the panel is opened, the tailgate end of the bed provides reasonable access, but items in the cab end of the bed must either be retrieved by climbing into the bed, or by squeezing the items through the limited height space between the bedrail and the hinge supports while standing beside the pickup.

Therefore, there is a continuing need for a cover for a vehicle storage compartment that provides the features of: significant top hauling capability; multi-panel design for access to all portions of the bed; simple, trackless, "no drilling required" assembly; and, the ability to remove individual panels quickly and easily. There is a further continuing need for a hard cover that protects the bed contents from the elements, prevents the stored goods from removal by undesired load shifting or theft, improves aerodynamics, and is capable of transporting a significant top cargo load. For purposes of this application, "significant load" is defined as exceeding 220 pounds, up to the rated limit of the pickup truck or vehicle. These rated weight limits vary according to vehicle and can be located on the vehicle's registration. Additionally, there is a continuing need for a cover that allows easy access to all portions of the bed, provides removable panels for easy and quick assembly, installation, removal, disassembly, and storage of the cover, and further requires no external tracks or braces or drilling into the side or end walls of the truck bed.

SUMMARY OF THE INVENTION

The present invention is a hard cover that protects the bed contents from the elements, prevents the stored goods from removal by undesired load shifting or theft, improves aerodynamics, is specifically designed to support and carry a large top load, is hinged to allow access to all portions of the bed, has individually removable panels, and requires no large external tracks or braces, and requires no drilling for installation on the vehicle.

The present invention is a hard cover comprised of at least two panels comprised of a thin rigid material attached to, and preferably surrounding structural members. Each panel is hingedly connected to at least one other panel to provide hinged opening of the panels to provide access to all areas of the internal storage space of a vehicle's storage bed without the need to completely remove the cover. The cover is designed to support a significant top load, whether static or dynamic. The cover further provides a water resistant covering to impede water from entering the bed of the pickup truck. The cover's rigid panels and locks provide for excellent security of goods stored in the vehicle bed. In addition, the panels of the cover are designed to be individually removable, allowing for quick removal of one or more panels of the cover. At least one panel is substantially secured to the bedrails of the vehicle by removable attachment means. Support means, preferably gas springs, prop rods, pneumatic canisters, spring hinges, springs and the like, are attached to the substantially secured panel, rather than to the bedrails. These unique features eliminate the need for drilling into the vehicle storage bed, or having to install a separate track system to attach the cover.

The preferred embodiment of the present invention consists of three panels. The center of these three panels is removably attached to the top of the bedrails by removable attachment means, such as but not limited to C-clamps, vices, truck cap clamps, velcro®, adhesives, and other non-destructive removable attachment means. Preferably, the center panel is attached at about the longitudinal center of the bed. The other two panels are secured to this center panel using hinge means to allow access to the pickup truck bed from both the cab and tailgate portion of the bed. The hinge means of this embodiment are separable so as to allow each panel to easily be removed. This embodiment further preferably incorporates a gutter or one or more panels such that water runoff is captured and drained to a desirable location when a panel is opened.

Another embodiment of the present invention provides two panels, and works particularly well on vehicles with a short rear storage compartment. The two-panel design includes one panel that is substantially secured to the bedrails, preferably close to the cab. The other panel is hingedly attached to the substantially secured panel, and can be easily detached as in other embodiments.

In any embodiment, the panel closest to the cab may have an aperture large enough to permit the insertion of a large toolbox. Preferably, the toolbox edges rest on the upper surface of the panel to secure the toolbox, and maintains a water resistant seal between the toolbox and the cover.

Another embodiment of the present invention incorporates a ladder rack and a cab guard as additional features of the hinged cover. These features provide for ladders and other long objects to be carried over the cover and cab, without interfering with the operation of the cover or panels. The cab guard feature further provides protection for the cab window and the cab portion of the truck, without interfering with the hinge operation of the cover.

Other features and advantages of the present invention will be apparent from the following more detailed description of the preferred embodiment, taken in conjunction with the accompanying drawings which illustrate, by way of example, the principles of the invention. The illustrated embodiments demonstrate some, but not all of the possible embodiments of the present invention.

BRIEF DESCRIPTION OF THE DRAWINGS

The invention will be further understood from the following description and drawings which show preferred embodiments of the present invention, wherein.

DETAILED DESCRIPTION OF THE INVENTION

Figure 1:
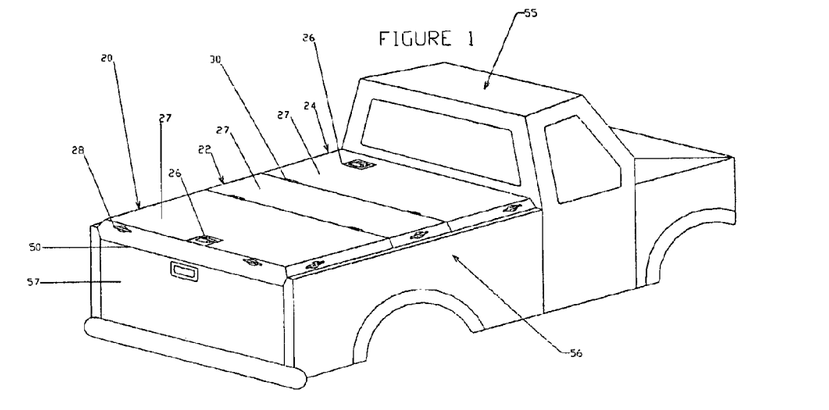
FIG. 1 is a partial perspective view of the cover in accordance with the three-panel embodiment of the present invention.

FIG. 1 is a partial perspective view of the cover according to the three-panel embodiment of the present invention, shown in closed position and installed on a pickup truck. The view is shown from the right hand side of the pickup truck, looking down at the bed. The cover in this embodiment includes a tailgate panel 20 located closest to the tailgate of the pickup truck 57. The tailgate panel 20 is attached by separable hinges such as slip joint hinges 30 to a center panel 22. At least one panel, here the center panel 22 is secured to the top portion of the bedrail 56 by removable attachment means 44, here shown as a plurality of C-clamps (as further detailed in FIG. 13). The preferred placement of the center panel 22 and attachment means 44 can be clearly seen in FIG. 8. The center panel 22 is also hingedly attached to a cab panel 24 located closest to the cab compartment of the pickup truck 55, and to the tailgate panel 20, by hinge means 30, here shown as slip joint hinges.

The cab panel 24 and the tailgate panel 20 are lockable, with locking mechanism 26 that control locking rods 25 which engage the underneath edge of the bedrail 56. This is further detailed in FIG. 8. In the embodiment shown, the cab panel 24 and the tailgate panel 20 are unlocked using lock mechanisms 26 such as slam latches, or paddle locks to retract the locking rods 25. The locks 26 are preferably made of stainless steel or other rigid corrosion-resistant metal, and are sturdy enough to make the cover completely secure from theft when locked. An additional security feature that can be seen in the embodiment of FIG. 1 is a tailgate security flap 50. The tailgate security flap 50 is used to enclose the tailgate of the pickup truck 57. Where a truck lacks a locking tailgate, the tailgate security flap 50 of the present invention extends over the tailgate to secure the tailgate from opening. The tailgate security flap 50 is preferably a continuous extension of the rigid casing 27 of the tailgate panel 20.

Figure 2:
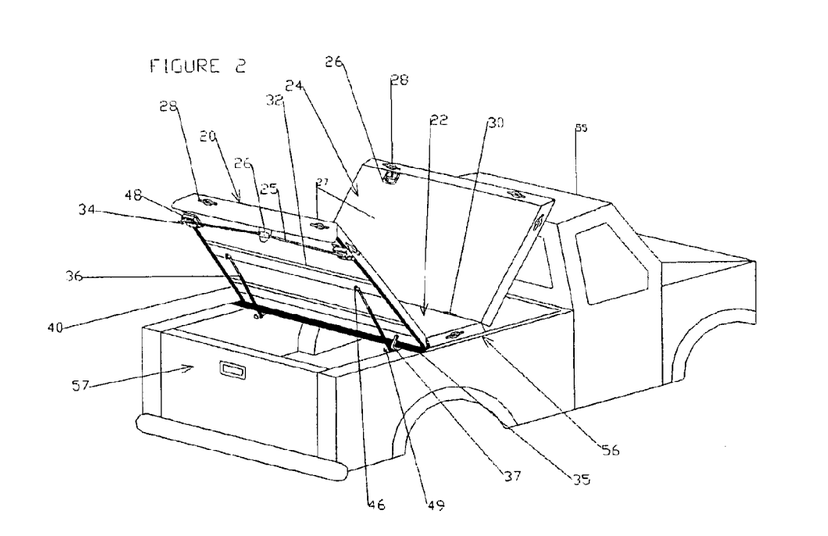
FIG. 2 is a partial perspective view of the cover in accordance with the three-panel embodiment of the present invention in open position installed on the truck bed.

Each panel of the present invention is composed of a thin rigid casing 27 attached to structural members 32 (shown in FIG. 2). This rigid casing 27 may be formed from a vast range of rigid materials including metal, fiberglass, plastic or other resin-fiber combinations, plastics, polymers, or a combination of any of these. The preferred materials used to form the rigid casing 27 of the present invention are durable corrosion-resistant materials such as aluminum, stainless steel, or zinc coated, galvanized, powder coated, or painted steel. However, plastics, polymers and fiberglass can also be used. The thickness of the material used for the rigid casing 27 is between about 0.05 inches and about 3 inches, depending on the casing material and the type and configuration of structural members 32. The structural members 32 may be comprised from a wide array of rigid materials such as aluminum, stainless steel, carbon steel, fiberglass and other resin fiber combinations, plastics, polymers, or any combination of these and other rigid materials. The structural members 32 can be any longitudinal force bearing structure. The members 32 may have any shape that exhibits significant strength when a load is applied perpendicular to its longitudinal axis, such as but not limited to, beam, right angle, c-channel, u-channel, tube (round or square), I-beam, honeycomb. The spacing of structural members 32 will vary with the materials used for the members 32 and rigid casing 27. For instance, if the structural member is in a honeycomb shape, the spacing and support will be uniform and continuous for each panel. In this case, the rigid casing 27 will not need to bear much, and can be made of a thinner and lighter material. Conversely, if structural members are in a slender beam shape, the spacing will depend more heavily on the rigidity of the rigid casing 27.

The embodiment of the present invention shown in FIG. 1 uses the preferred combination of ⅛" (inch) thick aluminum rigid casing 27 enclosing c-channel zinc galvanized steel structural members 32. The casing in this embodiment is commonly referred to as diamond tread plate aluminum. The structural members 32 are spaced no greater than 12 inches apart from each other and are positioned perpendicular to the bedrails 56 of the vehicle. This spacing provides sufficient strength for the cover to support a significant top load. The cover built according to this embodiment was mounted on top of a 2000 Ford F-150 short bed and was shown to easily support a load of 1500 lbs with negligible deflection in the cover.

The structural members may be attached to the rigid material by riveting, welding, bolting, or any other method. Alternatively, as shown in FIG. 1, the members 32 can be enclosed by the rigid casing 27. In either embodiment, the structural members 32 enable the cover to support a significant top load by transferring the weight directly to the bedrails 56 of the truck. The top load is preferably secured during transportation by tie down means 28 provided on the exterior surface of the casing 27, such as, but not limited to, cleats, rails, rings, or other known means. Preferably, straps are used in conjunction with the tie down means in order to prohibit lateral motion of objects carried on top of the cover.

FIG. 2 is a partial perspective view of the tonneau cover built according to the three-panel embodiment of the present invention, shown in open position. The view is shown from the right hand side of the pickup truck, looking down at the present invention with the tailgate panel 20 and the cab panel 24 in open position. The center panel 22 is shown secured to the top of the bedrail 56. FIG. 2 further shows the components of the underside of the tailgate panel 20, further detailed in FIG. 3. The rigid casing 27, structural members 32, and the slide stop 37 are also shown. The slide stop 37 prevents the panels from separating while the support means are attached. Also shown in this view are the placements of the locking rods 25, support means 36 shown as gas springs, gutter 35, and weather strip 40. These preferred features, placements and details are further detailed in FIGS. 3–12.

Figure 3:
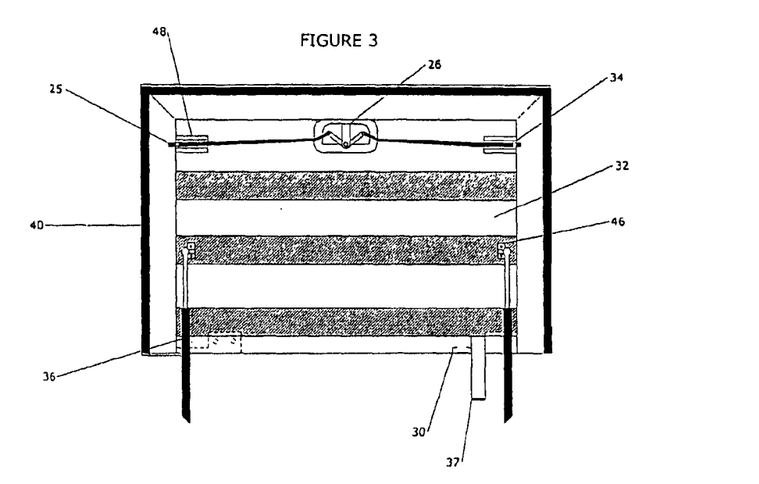
FIG. 3 is an underside view partially in section, of the tailgate panel from FIGS. 1 and 2.

FIG. 3 is an underside view of the tailgate panel 20. This view shows the preferred placement of the locks 26 and the locking rods 25. The rods are guided by the rod guide 34 shown more clearly in FIG. 8. The rod guide 34 is supported by the rod guide bracket 48. Also shown in this view are the placements of the weather strip 40, the gas spring bracket 46, the slip joint hinges 30, the gas springs 36, the structural members 32 and the slide stop 37. The support means 36 are designed to be removable from the support bracket 46 to allow the panel to rotate completely. The hinge means 30, here shown as slip joint hinges allow each panel to be removed separately for easy installation, by rotating the panel past the point where the slide stop 37 no longer prohibits sliding. The slide stop 37 otherwise keeps the panel from detaching while in use. The weather strip 40 contacts the top of the bedrail 56 when the cover panels are closed to create a water resistant seal.

Figure 4:
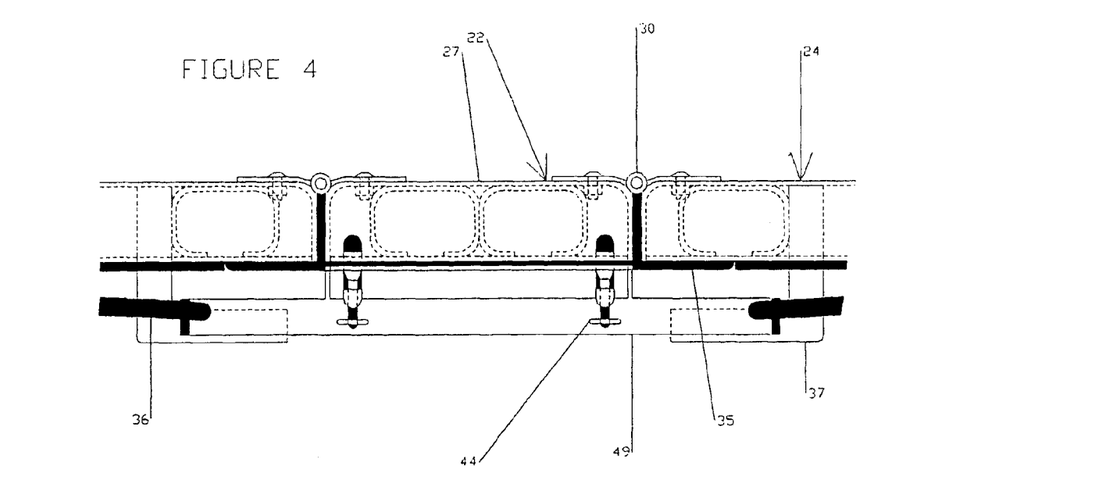
FIG. 4 is a cross-sectional side view of the center panel from FIGS. 1 and 2.

FIG. 4 is a profile view of the center panel 22 and its connections to the tailgate panel 20 and the cab panel 24. The center panel 22 is secured to the top of the bedrail 56 by removable attachment means 44 shown here as C-clamps. The preferred position and type of removable attachment means 44 is also shown. Also seen here is the support means brace 49, which is connected to the center panel 22. The support means 36, here shown as gas springs, are connected to this brace, and extend to each panel. Hinge means 30, shown here as slip joint hinges, connect each panel. The slip joint hinges 30 allow for the panels to be easily disconnected by sliding the panels in opposite directions when the cab panel 24 and the tailgate panel 20 are in the open position and rotated past the point at which the slide stop 37 no longer prohibits sliding. This allows for easy assembly and removal of the tonneau cover, and also allows for a variety of panel combinations on the truck bed, with some panels in place and others removed. This feature is further illustrated in FIG. 12. Also shown is the rubber gutter 35, which catches and drains water that runs off either the tailgate panel 20 or the cab panel 24 when the panels are opened, thereby protecting the bed from excessive moisture.

Figure 5:
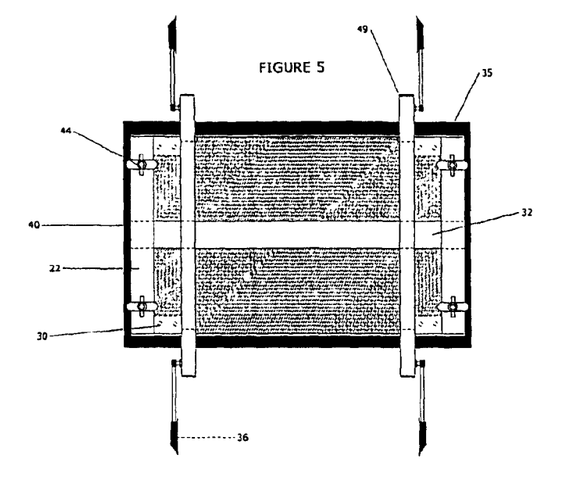
FIG. 5 is an underside view partially in section, of the center panel from FIGS. 1 and 2.

FIG. 5 is an underneath view of the center panel 22. This panel is secured to the top of the sidewall of the pickup truck 56 by attachment means 44, here shown as four C-clamps. The two support braces 49 are also shown with support means installed, here shown as four gas springs 36 attached. The preferred position of the rubber gutter 35, the weather strip 40, and the structural member 32 can also be seen in this view.

Figure 6:
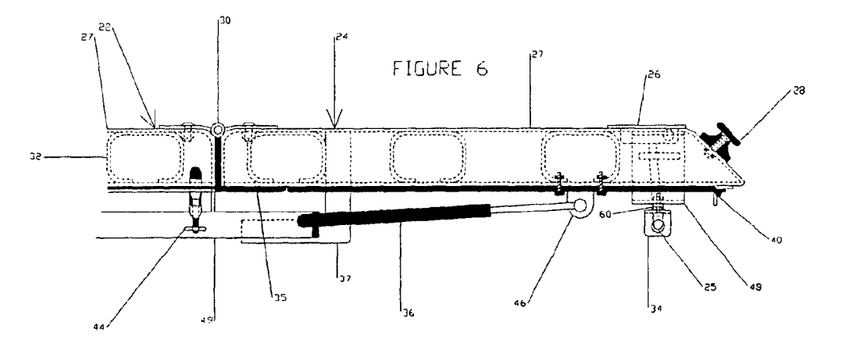
FIG. 6 is a cross-sectional side view of the cab or tailgate panels from FIGS. 1 and 2.

FIG. 6 cross-sectional side view of either the cab panel 24 or the tailgate panel 20. They are symmetrical in profile. This view shows more closely the preferred positioning of the support means brace 49 and the support means bracket 46 and the attachment of the support means 36 in between the two. This view also closely shows a preferred position and type of the slide stop 37. When the panel is rotated about its slip joint hinges 30, the slide stop 37 clears the support brace 49 and allows the panel to slide off. Also shown here are the positions of a locking means 26, here shown as a T-handle lock, the locking rods 25, the rod guide bracket 48, the rod guide 34, and the tie down cleats 28.

Figure 7:
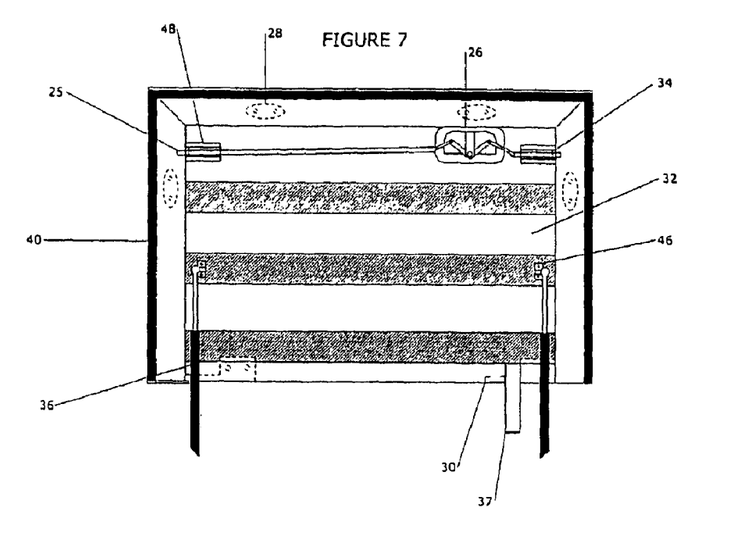
FIG. 7 is an underside view partially in section, of the cab panel from FIGS. 1 and 2.

FIG. 7 is an underside view of the cab panel 24. The components of this embodiment are symmetrical with the tailgate panel 20 shown in FIG. 3 with the exception of the placement of the locking means 26. The particular placement and use of the T-handle lock 26 shown allows the cab panel 24 to be easily reached from behind the pickup for opening.

Figure 8:
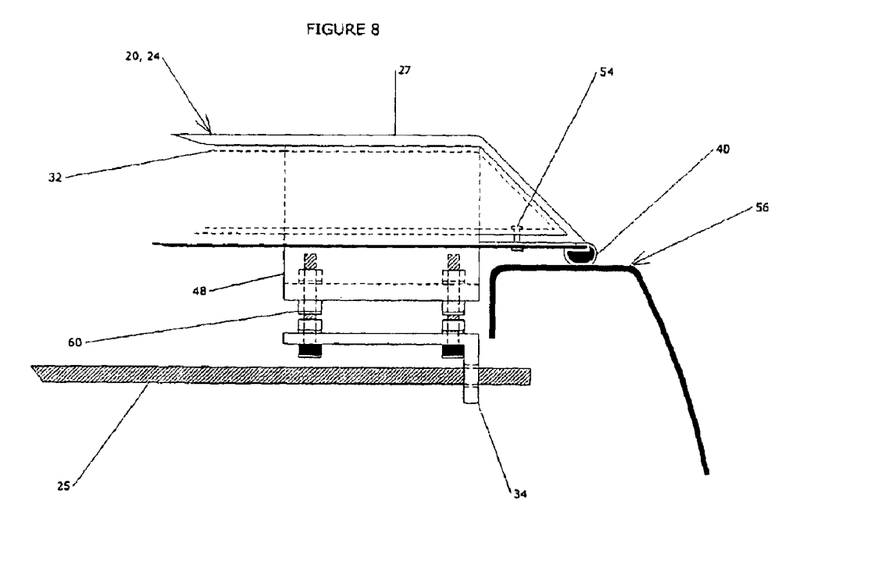
FIG. 8 is a side end cross-sectional view of bolt latch mechanism in closed position.

FIG. 8 is an exploded view of the locking mechanism with the locking rods 25 in closed position. The rod guide 34 can be seen bolted to the top of the rod guide bracket 48. The rod guide bracket 48 positions the locking rods 25 to fit directly under the lip of the bedrail 56. The rod guide 34 can be finely adjusted by using the height adjustment nuts 60. In particular, the nuts can be turned to raise or lower the rod guide 34 allowing the locking rods 25 to be specifically adjusted to each truck to ensure locking under the bed side rails.

Also seen in FIG. 8 are the ends of structural members 32. In the preferred embodiment, the members 32 are sized to fit inside the rigid casing 27 and are attached to the casing using rivets 54. Other embodiments of the present invention secure the structural members 32 to the rigid casing 27 by welding, bolting, or adhering. The rigid casing 27 is preferably bent so that a portion is parallel with the horizontal top of the bedrail 56. The rivets 54 are driven through this portion into the structural members 32. Weather strip 40 is attached to the horizontal face of the rigid casing 27, creating a watertight seal when the panel is closed.

Figure 9:
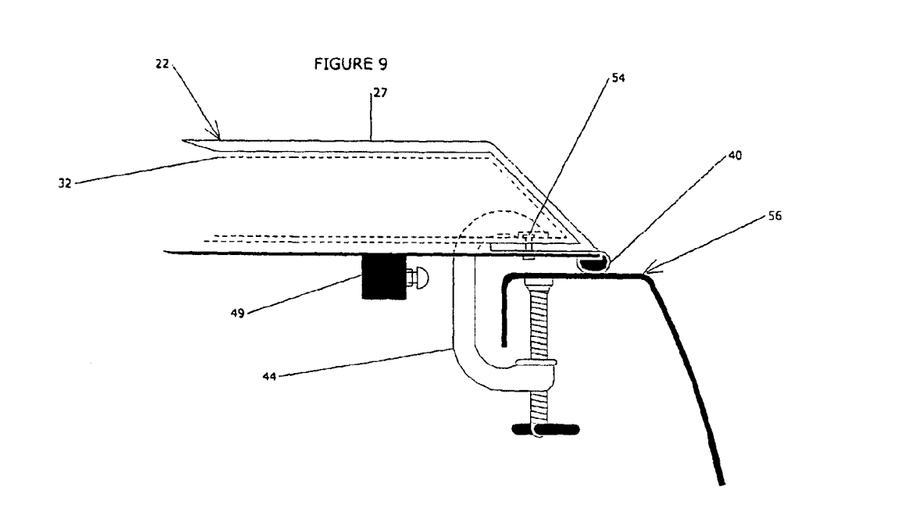
FIG. 9 is a side end cross-sectional view of connection to the bedrail.

FIG. 9 is an exploded view of the removable attachment means 44 connection to the top of the bedrail 56. In this embodiment, in order to secure the center panel 22 of the tonneau cover shown in FIGS. 1 and 2 to the pickup truck, four C-clamps 44 are positioned around the bottom lip of the top of the bedrail 56 and the horizontal portion of the rigid casing 27. The C-clamps 44 provide sufficient force to securely connect the tonneau cover to the pickup truck bed. This attachment method and attachment means allows for simple assembly without the necessity of tracks, braces, or drilling into the truck bed. This figure also shows the preferred position of the gas spring brace 49 without the gas spring attached.

Figure 10:
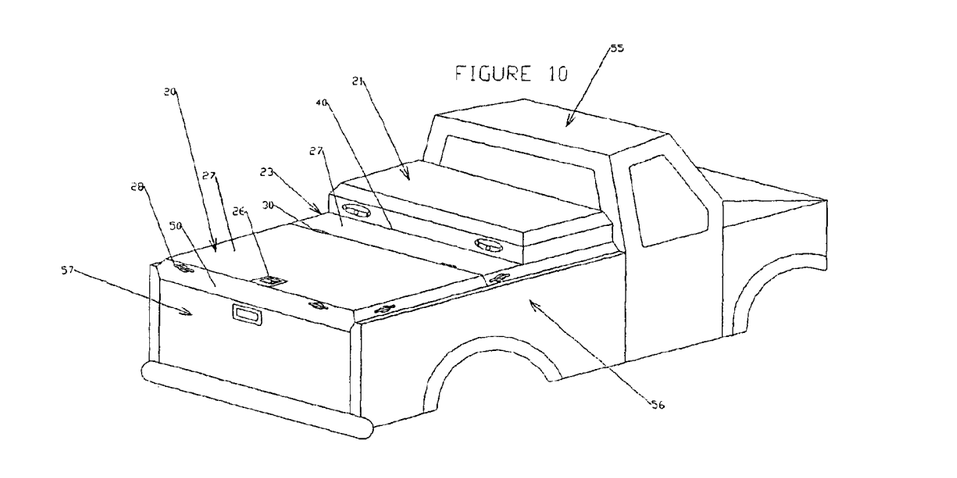
FIG. 10 is a partial perspective view of the two-panel embodiment of the present invention used in conjunction with a pickup truck toolbox.

FIG. 10 is a partial perspective view of the present invention according to the two-panel embodiment. The embodiment shown allows use in conjunction with a pickup truck toolbox 21. The cab panel 23 contains an opening to accept the base of the pickup truck toolbox 21. The edges of the pickup truck toolbox 21 are preferably bolted into portions of the cab panel 23 that run on top of the sidewalls of the pickup truck bed 56. This prevents the pickup truck toolbox 21 from having to be bolted into the truck bed. The cab panel 23 is secured to the pickup truck bed using removable attachment means 44 such as C-clamps. This attachment connection is further detailed in FIG. 8. The tailgate panel 20 is preferably pivot able on quick release hinges 30 to provide access to the rear portion of the bed without removing the whole cover. Weather strip 40 is provided between the pickup truck toolbox 21 and the cab panel 23 to create a water resistant seal.

Figure 11:
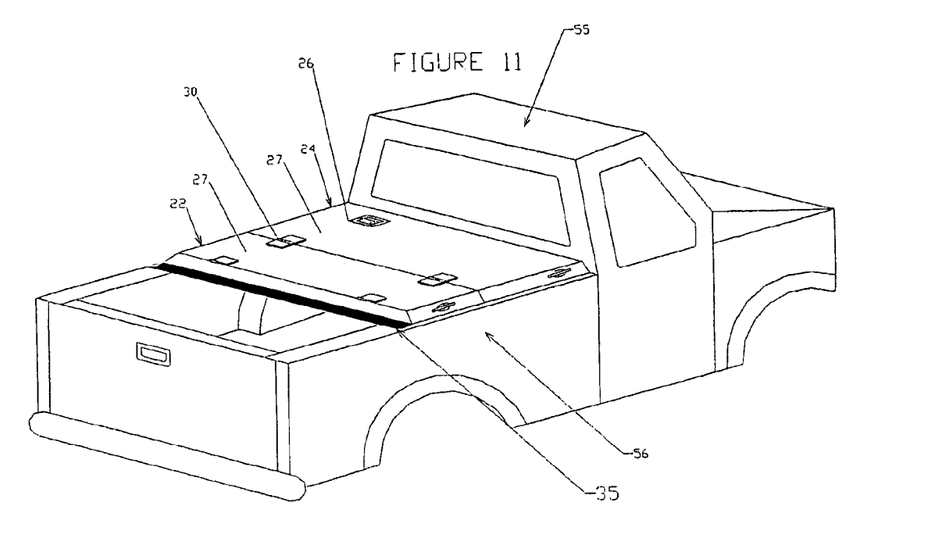
FIG. 11 is a partial perspective view of the cover in accordance with the three-panel embodiment of the present invention with the tailgate panel removed.

FIG. 11 is a partial perspective view of the present invention according to the three-panel embodiment, showing the tailgate panel 20 removed. This view shows that each panel can be removed separately to yield any combination of a fixed panel and optional additional hinged panels. This unique feature allows the user to carry a tall object in the bed of the truck without removing the entire cover. Also clearly displayed in this view is the placement of the gutter 35. The gutter 35 can be made of rubber, plastic, or other flexible material, and is configured, such as by including a slope, to channel water away from the interior of the bed and empty it out over the bedrails 56.

Figure 12:
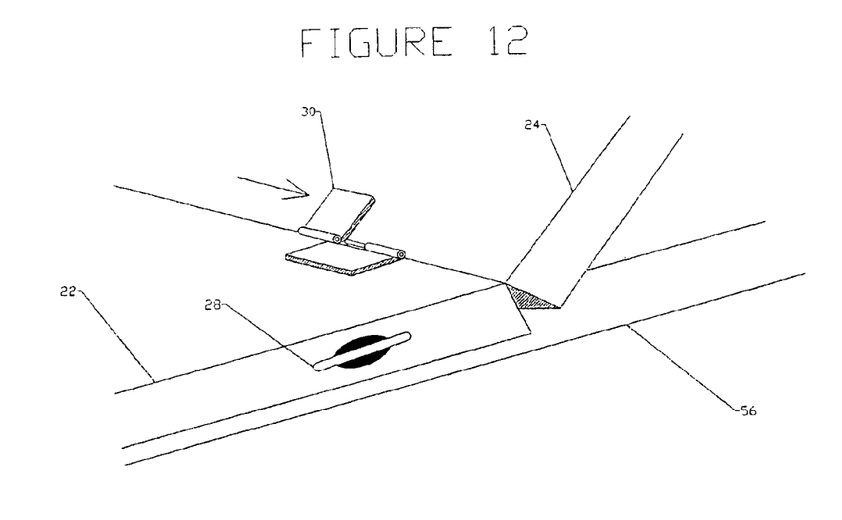
FIG. 12 is an enlarged view of the hinge connection of the panels.

FIG. 12 is an exploded view of the preferred hinge means of the cab panel 24 with the center panel 22. This hinge means 30 is preferably the same as the means 30 between the center panel 22 and the tailgate panel 20. As shown, slip joint hinges 30 slide on in the direction of the arrow in the picture, the male end of the slip joint hinge 30 preferably being fastened to the center panel 22 and the female end preferably fastened to the cab panel 24. However, the alternative combination is equally sufficient. When the panels are to be removed, the slip joint hinges 30 are simply slid in the opposite direction. The cab panel 24 is shown at an angle in this view. To remove the panel 24, the panel must be rotated on its slip joint hinge 30 to the point where the slide stop 37 clears the gas support means brace 49. This is a safety feature to prohibit the panel from sliding off under normal opening conditions.

Figure 13:
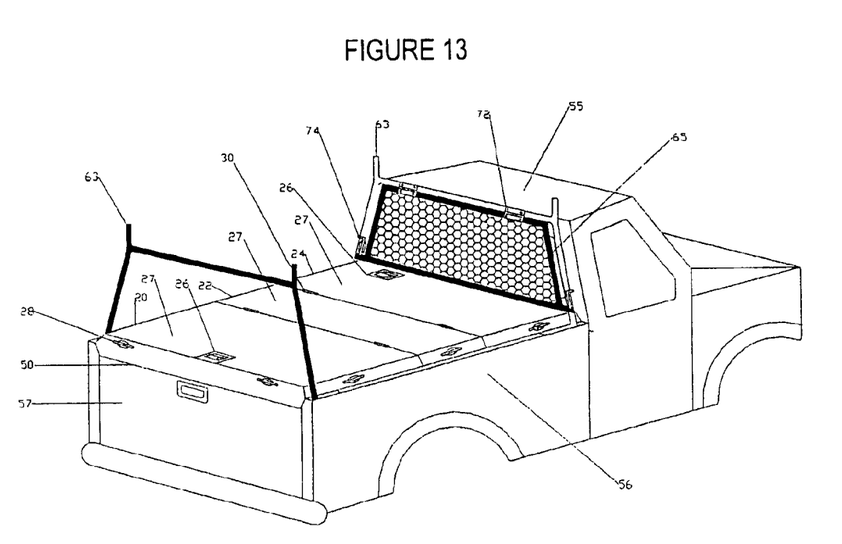
FIG. 13 is a partial perspective view of the ladder rack and cab guard features of the present invention.

FIG. 13 is a partial perspective view of an embodiment of the present invention including the ladder rack 63 and a cab guard 65 attachment that secures to the ladder rack 63. The unique design of the ladder rack 63 provides storage for lengthy objects above the cover while still allowing the panels of the present cover to be hingedly opened, closed, or removed while the rack 63 remains attached to the storage bed. Additionally, the rack 63 and cab guard 65 may be used as tie-down locations for securing top loads placed on the cover. The ladder rack 63 includes a front rack section and a rear rack section that are mirror images of one another. The vertical rail portions of the ladder rack 63 are each secured to a thin mounting plate made of rigid material that is bent or formed to fit around the top portion of the bedrails 56. The mounting plate is preferably aluminum, steel, or other material that is supportive under load, and is corrosion resistant. The preferred rigid material is 3/16 inch thick aluminum sheet metal. The mounting plate must be thin enough to still allow closure of the panels without obstruction, yet strong enough to support the ladder rack 63 and any load placed on top of the ladder rack 63. The mounting plate is preferably secured to the inside vertical wall of the bedrails 56 using removable means such as clamps, vices, bolts, screws, adhesives, or the like. The panels of the cover close on top of the mounting plate without adverse effect. The vertical rails of the ladder rack 63 are secured to the potion of the mounting plate that protrudes from under the cover using known attachment means such as bolts, screw, welding, nesting tabs, or the like.

Also shown in FIG. 13 is a cab guard 65 used in conjunction with the front ladder rack and cover of the present invention. The purpose of this cab guard 65 is to prevent top loads from shifting forward and hitting the cab window during loading or transport. The cab guard 65 is comprised of rigid material such as steel, aluminum, or other suitable rigid material that is capable of supporting static and dynamic loads. The cab guard 65 is preferably configured to include a metallic screen or fence-type material, closely spaced bars, or other rigid and durable material and design so as to resist bending or penetration by shifting top loads while still providing visibility out the rear cab window. Preferably, the cab guard 65 is hingedly attached to the horizontal rail portion of the ladder rack 63 using hinge means 72. The cab guard 65 is also preferably secured to the vertical rails of the ladder rack 63, such as by a hitch pin, removable bolt, or other easily detachable travel stop and locking means 74. The cab guard may also be attached using the aforementioned detachable travel stop and locking means 74, to the cab panel 24 of the cover. Both of these detachable travel stop and locking means 74 allow for securing of the cab guard 65 during loading or transportation, and pivoting of the cab guard about its hinged connection to the horizontal rails of the ladder rack 63 as the cab panel 24 of the cover is opened.

Yet another embodiment incorporates a cab guard 65 directly into the cab panel 24. The cab guard 65 in this particular embodiment may be formed by the casing 27, or may be a separate piece that is permanently or removably attached to the casing 27 using hinge means, such as slip joint hinges or travel stop hinges, or by non-hinged attachment means such as bolts, screws, and the like. In the preferred embodiment, the cab guard 65 remains attached to the cab panel 24 as the panel is raised or lowered.

The present invention is designed for easy operation both in the assembly phase and in the use phase. In the assembly phase, many advantages over prior art can be observed. To assemble the present invention, in accordance with the three-panel embodiment, one would secure the center panel 22 to the top of the bedrail 56 using removable attachment means 44 such as multiple C-clamps (as shown in FIG. 13). The center panel 22 is preferably installed in the center of the longitudinal direction of the pickup truck bed. Once the center panel 22 is secured, the tailgate panel 20 and the cab panel 24 can be easily assembled by sliding the slip joint hinges 30 together. Once all panels are attached, gas springs 36 can be attached to the gas spring brackets 46 on both the tailgate panel 20 and the cab panel 24. The gas springs 36 are also attached to the gas spring braces 49 that are secured to the center panel 22. As previously described, locking rods 25 can be adjusted by turning the height adjustment nuts 60 to increase the latch depth for use with a particular vehicle. The locking rods should position directly under the lip of the bedrail as seen in FIG. 8. Preferably, all assembly processes can be accomplished quickly and easily with minimal use of tools and no drilling. Also, the absence of a track or bracing system to support the tonneau cover allows one to assemble the cover without the need to purchase or obtain extraneous parts.

Many other advantages of the present invention are observed with the cover installed and in active use. With the cover in closed position, as seen in FIG. 1, aerodynamics are improved due to enclosing of the pickup truck bed. Also, the weather strip 40 around the edges and the gutter 35 prevents water from entering the pickup truck bed when closed. This allows for the storage of goods that could not be stored in a pickup truck bed without a water resistant cover. To prevent removal of stored goods by theft, keyed locking means, preferably stainless steel T-handle locks, are provided. The lock prohibits the locking rods 25 from being retracted and thus prevents opening of the cover. Also, as shown in FIG. 1, a tailgate security flap 50 can also be provided to keep non-lockable tailgates from being opened.

This cover consumes no floor space of the rear storage compartment and consumes effectively no internal volume of this storage compartment. Another unique feature, and perhaps the most exciting feature of the present invention is that it is specifically designed to transport significant loads on top of the tonneau cover. Internal structural members 32 transfer loads directly into the bedrails 56 allowing the user to load and carry significant weight on top of the cover. Tie downs such as cleats 28 shown in FIG. 1, are preferably provided to permit use of straps to secure all top loads.

To open the tailgate panel 20 and the cab panel 24 (shown in FIG. 2), the user turns the T handle lock 26, this retracts the locking rods 25 and the gas springs 36 propel the panels upward. This allows for easy access to both the front and rear portions of the pickup truck bed without removing the cover. To close the tailgate panel 20 or the cab panel 24, the user must apply ample force to cause the gas springs 36 to compress. The user then turns the T handle lock 26 to extend the locking rods 25 underneath the lip of the bedrail 56 as shown in FIG. 8.

The unique hinge means 30 comprising a slip joint hinge design allows for each panel to be operated and removed individually. This unique feature gives an advantage in both shipping and in use. In shipping, the size of the shipped package can be drastically reduced by detaching and stacking the panels of the cover. In use, the truck owner can haul large or tall objects in the bed simply by removing one or more panels. In storage, the disassembled cover requires from ½ to ⅓ of the space needed to store single panel covers. Moreover, additional storage options are presented by the instant invention, such as simply removing one or more panels, rotating each panel, and laying each panel in the bed of the truck.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A cover for the rear storage compartment of a vehicle, the storage compartment having a vertical front wall adjacent the cab of the vehicle, an opposite rear wall, and two bedrails forming the sidewalls of the compartment, the cover comprised of at least three substantially rectangular panels, each panel comprised of a thin rigid casing attached to a plurality of structural members, the at least three panels further comprised of a center panel securely and non-hingedly mounted directly to the bedrails of the storage compartment, a front panel having an end hingedly mounted to the center panel and having an opposite unencumbered end adjacent the vertical front wall, and a rear panel having an end hingedly mounted to the center panel and having an opposite unencumbered end adjacent the rear tailgate, wherein the cover is of sufficient strength to support a significant top load.

2. The cover of claim 1, wherein the thin rigid casing is selected from the group consisting of metals, polymers, fiberglass, and resin fiber combinations.

3. The cover of claim 2, wherein the thin rigid casing is aluminum.

4. The cover of claim 3, wherein the structural members are at least partially enclosed by the thin rigid casing.

5. The cover of claim 3, wherein the structural members are substantially horizontally disposed and in substantially perpendicular orientation with the bedrails of the storage compartment.

6. The cover of claim 5, wherein the center panel is substantially secured directly to the bedrails of the rear storage compartment by removable attachment means.

7. The cover of claim 6, wherein the removable attachment means are selected from the group consisting of C-clamps, vices, truck clamps, adhesives, tie-downs, bolts, and screws.

8. The cover of claim 7, wherein the front panel and rear panel are hingedly attached to the center panel by removable hinge means.

9. The cover of claim 8, wherein the removable hinge means is comprised of at least one slip joint hinge.

10. The cover of claim 9, further comprising means to render the cover substantially water resistant when closed.

11. The cover of claim 10, wherein the cover further comprises gutter means for channeling water run off as the at least one other panel is opened.

12. The cover of claim 9, further comprising locking means for locking the at least one other panel.

13. The cover of claim 12, wherein the locking means are selected from the group consisting of T-handle locks, keyed locks, slam latches, push button locks, and paddle locks.

14. The cover of claim 12, further comprising support means attached to the center panel and attached to the at least one other panel for maintaining the at least one other panel in an open position.

15. The cover of claim 14, wherein the support means are selected from the group consisting of gas springs, prop rods, pneumatic canisters, spring hinges, and springs.

16. The cover of claim 12, wherein the locking means comprise locking rods mounted to a panel using adjustable rod brackets to permit the locking rods to engage under the bedrails to secure the cover to the storage compartment.

17. The cover of claim 16, wherein the locking means do not require any modification of the bedrails.

18. The cover of claim 13, wherein the locking means activate locking rods that secure the cover to the storage compartment by engaging under the existing bedrails.

19. The cover of claim 13, wherein the locking means do not require any modification of the bedrails.

20. The cover of claim 14, wherein the support means are arranged so as to limit the travel of the front and rear panel to prevent unintended separation of the panels by preventing disengagement of the removable hinge means.

* * * * *